United States Patent
Uchiyama

(10) Patent No.: US 9,640,795 B2
(45) Date of Patent: May 2, 2017

(54) POSITIVE-ELECTRODE ACTIVE MATERIAL PARTICLE FOR ALL-SOLID BATTERY AND METHOD FOR PRODUCTION THEREOF

(75) Inventor: Takayuki Uchiyama, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/116,253

(22) PCT Filed: May 15, 2012

(86) PCT No.: PCT/IB2012/000946
§ 371 (c)(1),
(2), (4) Date: Nov. 7, 2013

(87) PCT Pub. No.: WO2012/156802
PCT Pub. Date: Nov. 22, 2012

(65) Prior Publication Data
US 2014/0072875 A1    Mar. 13, 2014

(30) Foreign Application Priority Data
May 17, 2011    (JP) ................. 2011-110132

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0416* (2013.01); *H01M 4/0419* (2013.01); *H01M 4/134* (2013.01); *H01M 4/136* (2013.01); *H01M 4/505* (2013.01); *H01M 4/525* (2013.01); *H01M 4/581* (2013.01); *H01M 4/5815* (2013.01); *H01M 4/625* (2013.01); *H01M 10/052* (2013.01); *H01M 2004/028* (2013.01); *H01M 2220/10* (2013.01); *H01M 2220/20* (2013.01);
(Continued)

(58) Field of Classification Search
None
See application file for complete search history.

(56) References Cited

U.S. PATENT DOCUMENTS 5,705,291 A    1/1998    Amatucci et al.
6,991,662 B2*  1/2006    Visco et al. ............. 29/623.4
(Continued)

FOREIGN PATENT DOCUMENTS

CN    101877418 A    11/2010
JP    A-11-016566    1/1999
(Continued)

OTHER PUBLICATIONS http://www.merriam-webster.com/dictionary/holohyaline (Apr. 2015).*
(Continued)

*Primary Examiner* — Patrick Ryan
*Assistant Examiner* — Christopher Domone
(74) *Attorney, Agent, or Firm* — Oliff PLC

(57) ABSTRACT

A positive-electrode active material particle for an all-solid battery which includes a sulfide-based solid electrolyte includes an active material core and a reaction-inhibiting layer which contains carbon and with which the active material core is coated.

10 Claims, 2 Drawing Sheets

(51) Int. Cl.
*H01M 4/134* (2010.01)
*H01M 4/136* (2010.01)
*H01M 4/505* (2010.01)
*H01M 4/525* (2010.01)
*H01M 4/58* (2010.01)
*H01M 4/62* (2006.01)
*H01M 10/052* (2010.01)
*H01M 4/02* (2006.01)

(52) U.S. Cl.
CPC ........ *H01M 2220/30* (2013.01); *Y02E 60/122* (2013.01)

(56) References Cited

U.S. PATENT DOCUMENTS

| | | | | |
|---|---|---|---|---|
| 2007/0264574 | A1* | 11/2007 | Kim | B82Y 30/00 |
| | | | | 429/231.8 |
| 2009/0081554 | A1* | 3/2009 | Takada | H01M 4/13 |
| | | | | 429/322 |
| 2010/0112449 | A1 | 5/2010 | Fujita et al. | |
| 2010/0273062 | A1 | 10/2010 | Tsuchida et al. | |
| 2011/0065006 | A1 | 3/2011 | Ogasa | |
| 2011/0143195 | A1* | 6/2011 | Ito | H01M 4/134 |
| | | | | 429/199 |
| 2012/0052396 | A1* | 3/2012 | Tsuchida | H01M 4/131 |
| | | | | 429/304 |
| 2014/0295273 | A1* | 10/2014 | Mah | H01M 4/0471 |
| | | | | 429/220 |

FOREIGN PATENT DOCUMENTS

| | | |
|---|---|---|
| JP | A-2003-059492 | 2/2003 |
| JP | A-2006-032325 | 2/2006 |
| JP | A-2008-270175 | 11/2008 |
| JP | A-2010-135090 | 6/2010 |
| JP | A-2010-225309 | 10/2010 |
| WO | WO 2007/004590 A1 | 1/2007 |
| WO | WO 2010/064127 A1 | 6/2010 |

OTHER PUBLICATIONS

U.S. Appl. No. 13/889,335, May 2013, Singh; Mohit.*
Choi et al., Effects of carbon coating on the electrochemical properties of sulfur cathode for lithium/sulfur cell, *Journal of Power Sources*, vol. 184, No. 2, pp. 548-552, Oct. 1, 2008.
Ohta et al., Narumi, "LiNbO3-coated LiCoO2 as cathode material for all solid-state lithium secondary batteries", Electrochemistry Communications, vol. 9 (2007), pp. 1486-1490.

* cited by examiner

POSITIVE-ELECTRODE ACTIVE MATERIAL PARTICLE FOR ALL-SOLID BATTERY AND METHOD FOR PRODUCTION THEREOF

BACKGROUND OF THE INVENTION

1. Field of the Invention

The present invention relates to positive-electrode active material particles for an all-solid battery, and a production method for the positive-electrode active material particles.

2. Description of Related Art

In recent years, secondary (rechargeable) batteries have become essentially important as power sources for devices, such as personal computers, video cameras and cellular phones, or power sources for vehicles and for storage of electric power.

Among secondary batteries, lithium ion secondary batteries, in particular, have higher energy density and are operable at a higher voltage than other secondary batteries. Thus, lithium ion secondary batteries are used in information-related devices and communication devices as secondary batteries that can be easily reduced in size and weight. In recent years, high-output, high-capacity lithium ion secondary batteries for low-emission vehicles, such as electrical vehicles and hybrid vehicles, are being developed.

A lithium ion secondary battery or lithium secondary battery includes positive electrode layers, negative electrode layers, and an electrolyte. The electrolyte contains a lithium salt and is interposed between the positive electrode layer and the negative electrode layer. The electrolyte is composed of a non-aqueous liquid or solid. When a non-aqueous liquid electrolyte is used as the electrolyte, the electrolytic solution penetrates into the positive electrode layer. Thus, an interface is readily formed between the electrolyte and a positive-electrode active material that constitutes the positive electrode layer. As a consequence, the performance of the battery improves. However, because electrolytic solutions that are typically used are flammable, a safety device is provided to prevent temperature rise in the event of short-circuit. Alternatively, a system to ensure safety, such as one that prevents short-circuit, is installed. On the other hand, all-solid batteries, which use a solid electrolyte in place of a liquid electrolyte to create an all-solid structure, do not include a flammable organic solvent therein. Thus, all-solid batteries, which are conceivable to allow the safety device to be simplified and excel in production cost and productivity, are being developed.

In all-solid batteries, in which a solid electrolyte layer is interposed between the positive electrode layer and the negative electrode layer, the positive-electrode active material and electrolyte are solid. Thus, the electrolyte does not tend to penetrate into the positive-electrode active material and the interface between the positive-electrode active material and the electrolyte tends to decrease. Therefore, in all-solid batteries, a composite material that contains a mixed powder of a positive-electrode active material powder and a solid electrolyte powder is used in the positive electrode to increase the area of the interface.

Use of sulfide-based solid electrolyte as the solid electrolyte for, in particular, all-solid batteries is being examined. The sulfide-based solid electrolyte has excellent lithium ion conductivity. However, when the sulfide-based solid electrolyte is used, an interface resistance to the lithium ions that migrate through an interface between the active material and the sulfide-based solid electrolyte tends to increase. This is conceivable to be because the active material reacts with the sulfide-based solid electrolyte to form high-resistance portions in the surface of active material. The increase in interface resistance leads to a decrease in the performance of the all-solid battery. To address the increase in interface resistance, several techniques to prevent the increase in interface resistance have been disclosed. For example, a technique to reduce the interface resistance by coating the surface of the active material with, for example, lithium niobate has been disclosed (International Publication No. 2007/004590 (A1)).

In addition, the positive-electrode active material of an all-solid battery is composed of a metal oxide. Therefore, the positive electrode of the all-solid battery has poor electron conductivity. Thus, coating positive-electrode active material particles with a conductive aid is being examined. For instance, carbon and the like are used as the conductive aid. To coat active material particles with carbon, various methods, such as mechano-chemistry and pulsed laser deposition (PLD), may be used. Among these methods, mechano-chemistry, such as mechano-fusion, is often used. The mechano-fusion is high productivity method for forming a coat using mechanical energy, such as compression, friction or impact. (Japanese Patent Application Publication No. 2008-270175 (JP 2008-270175 A).

As described above, it is being examined to coat each of the active material particles with layers that inhibits a reaction between the active material and the sulfide-based solid electrolyte (which is hereinafter referred to as "reaction-inhibiting layer") in order to reduce the interface resistance between the active material and the sulfide-based solid electrolyte. On the other hand, it is also being examined to coat each of the active material particles with conductive aid to improve the electron conductivity therebetween.

It is, however, proved that when active material particles that have been respectively coated with reaction-inhibiting layers are coated with carbon by mechano-chemistry, such as mechano-fusion, mechanical stress which is generated by mechano-chemistry makes each of the reaction-inhibiting layers easy to peel off the active material particle. FIG. 1 is a cross-sectional schematic view of a particle of an active material according to a related art, which is obtained by coating an active material core which has been coated with a reaction-inhibiting layer with carbon by mechano-fusion.

As shown in FIG. 1, an active material particle 10 includes an active material core 11 and a reaction-inhibiting layer 12 that covers the active material core 11. When the active material particles 10 are coated with carbon by mechano-fusion, carbon layers 23 are respectively formed on the surfaces of the active material cores 21 of active material particles 20. However, the mechanical stress that is generated during the mechano-fusion makes some parts of the reaction-inhibiting layer 22 easy to peel off. Thus, regions with a reaction-inhibiting layer 22 and regions with no reaction-inhibiting layer 22 may be present on the surface of the active material core 21. There is a possibility that high-resistance portions are formed in the regions with no reaction-inhibiting layer 22 and decrease the performance of the battery.

SUMMARY OF THE INVENTION

The present invention provides a positive-electrode active material particle, for an all-solid battery, which prevents an increase in interface resistance between the active material and the solid electrolyte and that has electron conductivity, and a production method for the positive-electrode active material particles.

A positive-electrode active material particle for an all-solid battery which includes a sulfide-based solid electrolyte according to a first aspect of the present invention includes: an active material core; and a reaction-inhibiting layer which contains carbon and with which the active material core is coated.

A method for the production of a positive-electrode active material particle for an all-solid battery includes a sulfide-based solid electrolyte according to a second aspect of the present invention includes: preparing precursors of reaction-inhibiting layers that each contain a carbon source and that inhibit a reaction between the sulfide-based solid electrolyte and active material cores; coating the active material cores with the precursors of the reaction-inhibiting layers; and performing a heat treatment on the active material cores, which have been respectively coated with the precursors of the reaction-inhibiting layers, in an atmosphere with an oxygen concentration of 50 vol % or higher.

According to the aspect of the present invention, the reaction-inhibiting layers are respectively prevented from peeling off the surfaces of the positive-electrode active material particles. In addition, the reaction-inhibiting layers itself contain electronically-conductive carbon.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
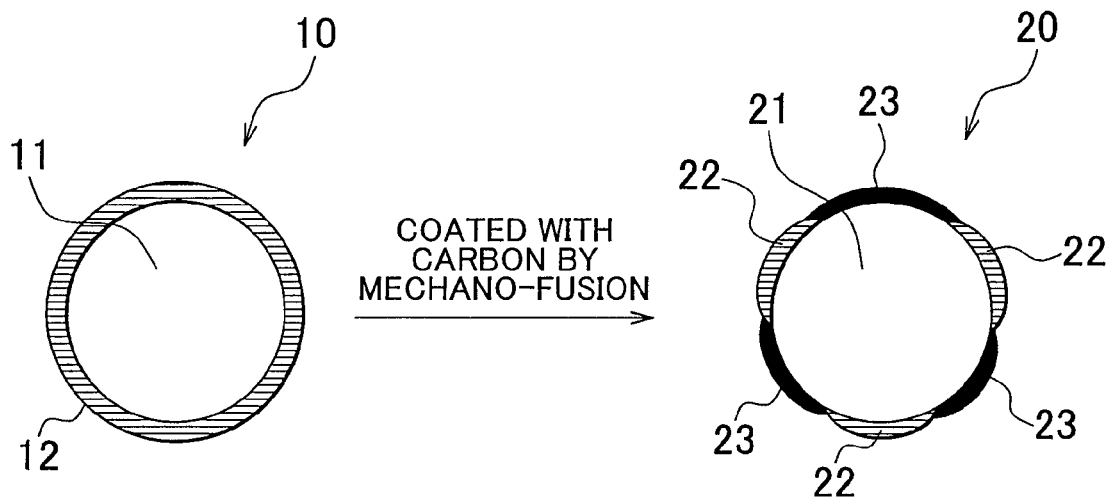
FIG. 1 is a cross-sectional schematic view of a particle of a positive-electrode active material according to a related art, which is obtained by coating active material cores which have been respectively coated with reaction-inhibiting layers with carbon by mechano-fusion.

An aspect of the present invention is directed to positive-electrode active material particles for an all-solid battery that contains a lithium-ion conducting sulfide-based solid electrolyte as an electrolyte. The positive-electrode active material particles respectively include active material cores and reaction-inhibiting layers. The reaction-inhibiting layers contain carbon and inhibit a reaction between the active material cores and the sulfide-based solid electrolyte. The active material cores are respectively coated with the reaction inhibiting layers.

In the aspect of the present invention, as a reaction inhibiting component of the reaction-inhibiting layers that each contain carbon, a component which inhibits a reaction between the positive-electrode active material and the sulfide-based solid electrolyte is used. Furthermore, the component has lithium conductivity. Examples of the reaction inhibiting component include lithium conducting oxides such as $Li_4SiO_4$, $Li_3PO_4$, $Li_3BO_3$, $Li_2SiO_3$, $LiPO_3$, $LiBO_2$, $Li_2SO_4$, $Li_2WO_4$, $Li_2MoO_4$, $Li_2ZrO_3$, $LiAlO_2$, $Li_2TiO_3$ or $Li_4Ti_5O_{12}$, or composite oxides thereof such as $Li_3BO_3$—$Li_4SiO_4$. The reaction inhibiting components are holohyaline.

The reaction-inhibiting layers, which contains carbon, that each coat the active material core of positive-electrode active material particle has a sufficient thickness to ensure lithium conductivity and to reliably inhibit a reaction between the active material core and the sulfide-based solid electrolyte. For example, the thickness is approximately 1 to 100 nm, preferably approximately 1 to 20 nm. When the reaction-inhibiting layer is too thick, the lithium conductivity tends to be poor. When the reaction-inhibiting layer is too thin, the surface of the active material core may not be completely coated with the reaction-inhibiting layer. This may result in the positive-electrode active material reacting with the sulfide-based solid electrolyte to form high-resistance portions.

In the aspect of the present invention, as an active material for cores of the positive-electrode active material particles, which active material cores are coated with the reaction-inhibiting layer, a material is used which exhibits a noble charge/discharge potential compared to a material of a negative-electrode active material and which is used as an electrode active material for a sulfide-based all-solid battery. Examples of the material of the positive-electrode active material cores include lithium cobaltate ($LiCoO_2$), lithium nickelate ($LiNiO_2$), lithium manganate ($LiMn_2O_4$), $LiCo_{1/3}Ni_{1/3}Mn_{1/3}O_2$, different-element substituted Li—Mn spinel that has a composition which is represented by $Li_{1+x}Mn_{2-x-y}M_yO_4$ (wherein M represents at least one metal element that is selected from Al, Mg, Co, Fe, Ni and Zn), lithium titanate ($Li_xTiO_y$), lithium metal phosphate ($LiMPO_4$, wherein M represents Fe, Mn, Co or Ni), transition metal oxides such as vanadium oxide ($V_2O_5$) and molybdenum oxide ($MoO_3$), titanium sulfide ($TiS_2$), carbon materials such as graphite or hard carbon, lithium cobalt nitride (LiCoN), lithium silicon oxide ($Li_xSi_yO_z$), lithium metal (Li), lithium alloys (LiM, wherein M represents Sn, Si, Al, Ge, Sb or P), lithium-storage intermetallic compounds ($Mg_xM$ or $Q_ySb$, wherein M represents Sn, Ge or Sb, and Q represents In, Cu or Mn), and derivatives of these substances. In the aspect of the present invention, the positive-electrode active material and the negative-electrode active material are not clearly distinguished. The charge/discharge potentials of two active materials are compared, and the one that exhibits a nobler charge/discharge potential is used in the positive electrode and the one that exhibits a less noble charge/discharge potential is used in the negative electrode. Thus, a battery with any voltage may be constituted.

The positive-electrode active material cores for use in the aspect of the present invention each have a particle size suitable for use in a positive electrode layer of an all-solid battery. For example, each of the particle sizes of the positive-electrode active material cores may be approximately 0.5 to 10 µm.

A positive electrode composite material for an all-solid battery is prepared by mixing the positive-electrode active material particles with a sulfide-based solid electrolyte. For example, a positive electrode may be obtained by mixing the positive-electrode active material particles and a sulfide-based solid electrolyte in a solvent to form a paste, applying the paste to a current collector such as aluminum foil, drying the paste and rolling the current collector.

The solid electrolyte which is used in combination with the positive electrode active material particles is a sulfide-based solid electrolyte. As the sulfide-based solid electrolyte, a solid electrolyte that contains sulfur and lithium and has lithium ion conductivity may be used. Examples of the sulfide-based solid electrolyte include sulfide-based amorphous solid electrolytes such as $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$ and $Li_2S$—$P_2S_5$.

As the solid electrolyte, a combination of the sulfide-based solid electrolyte with an oxide-based amorphous solid electrolyte, crystalline oxide, and/or crystalline oxynitride may be used. Examples, which may be used in combination with the sulfide-based solid electrolyte, include oxide-based amorphous solid electrolytes such as $Li_2O$—$B_2O_3$—$P_2O_5$, $Li_2O$—$SiO_2$, $Li_2O$—$B_2O_3$ and $Li_2O$—$B_2O_3$—$ZnO$, crystalline oxides such as $Li_{1.3}Al_{0.3}Ti_{0.7}(PO_4)_3$, $Li_{1+x+y}A_xTi_{2-x}Si_yP_{3-y}O_{12}$ (wherein A represents Al or Ga, $0 \le x \le 0.4$ and $0 < y \le 0.6$), $[(B_{1/2}Li_{1/2})_{1-z}C_z]TiO_3$ (wherein B represents La, Pr, Nd or Sm, C represents Sr or Ba, and $0 \le z \le 0.5$), $Li_5La_3Ta_2O_{12}$, $Li_7La_3Zr_2O_{12}$, $Li_6BaLa_2Ta_2O_{12}$ and $Li_{3.6}Si_{0.6}P_{0.4}O_4$, crystalline oxynitrides such as $Li_3PO_{(4-3/2w)}N_w$ (wherein w<1), LiI, LiI—$Al_2O_3$, $Li_3N$ and $Li_3N$—LiI—LiOH.

The positive electrode composite material may optionally contain, in addition to the positive-electrode active material particles and the sulfide-based solid electrolyte, other materials, such as conductive aid particles and binder. Examples of usable conductive aid particles include, but are not specifically limited to, graphite and carbon black. Examples of usable binders include, but are not specifically limited to, polytetrafluoroethylene, polytrifluoroethylene, polyethylene, nitrile rubber, polybutadiene rubber, butyl rubber, polystyrene, styrene-butadiene rubber, styrene-butadiene latex, polysulfide rubber, nitrocellulose, acrylonitrile butadiene rubber, polyvinyl fluoride; polyvinylidene fluoride and fluorine rubber.

The positive-electrode active material cores of the aspect of the present invention each have a reaction-inhibiting layer which is coated thereon and in which electronically-conductive carbon is dispersed. Thus, the amount of conductive aid in the positive electrode composite material may be smaller than that in the conventional case where a conductive aid is additionally added to a positive electrode composite material.

The current collector for the positive electrode is not specifically limited. For example, a foil of a metal, such as Al, Cu, Ni or stainless steel, with a thickness of approximately 10 to 500 μm may be used.

An all-solid battery may be produced by a method that is well-known in this field using the positive-electrode active material particles of the aspect of the present invention. For example, an all-solid battery may be produced by laminating a positive electrode that is prepared as described above, a sulfide-based solid electrolyte, and a negative electrode that includes a current collector, such as copper foil, and pressure-molding the laminate.

The other aspect of the present invention is also directed to a production method for positive-electrode active material particles for an all-solid battery that includes a sulfide-based solid electrolyte. The production method includes preparing precursors of reaction-inhibiting layers that each contain a carbon source, coating each of the active material cores with the precursor of the reaction-inhibiting layer, and performing a heat treatment on the active material cores, which have been respectively coated with the precursors of reaction-inhibiting layers, in an atmosphere with an oxygen concentration of 50 vol % or higher.

The other aspect of the present invention is directed to a method for forming each of the reaction-inhibiting layers on the surface of the active material core and chemically generating carbon in each of the reaction-inhibiting layers simultaneously. According to the other aspect of the present invention, the positive electrode can be simultaneously provided with electron conductivity and a function that inhibits a reaction between the active material and the sulfide-based solid electrolyte. In addition, according to the other aspect of the present invention, because there is no need to coat the active material cores with carbon after the formation of the reaction-inhibiting layers, the reaction-inhibiting layers are prevented from peeling during the coating process.

Figure 2:
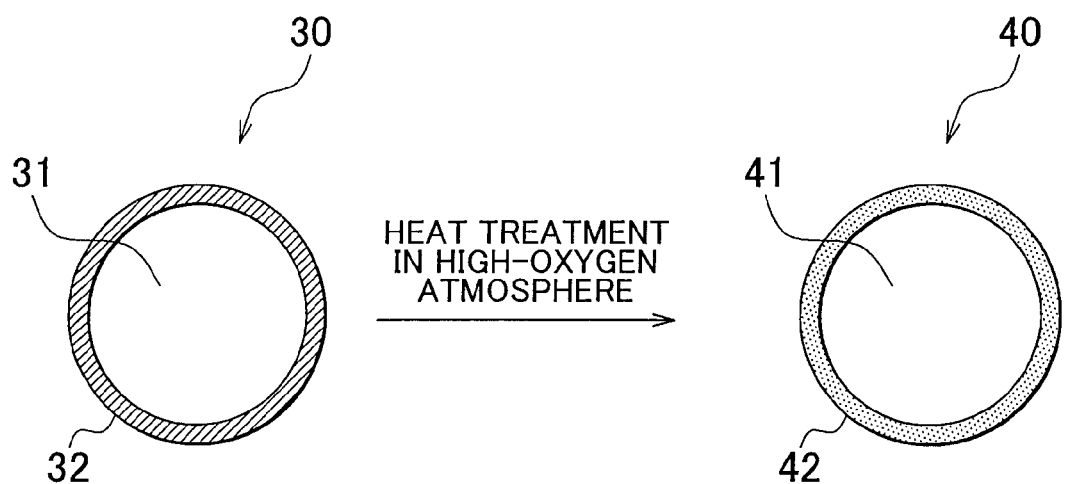
FIG. 2 is a cross-sectional schematic view of a particle of a positive-electrode active material according to Example of the present invention, which is obtained by thermally treating active material cores that have been respectively coated with precursors of reaction-inhibiting layers that each contain carbon in a high-oxygen atmosphere.

It has been found that carbon is present in the form of simple substance in each of the reaction-inhibiting layers after the heat treatment of the active material cores that have been respectively coated with precursors of reaction-inhibiting layers in a high-oxygen atmosphere. FIG. 2 is a cross-sectional schematic view of a particle of the positive electrode active material, which is obtained by performing a heat treatment on the active material core that has been coated with a precursor of reaction-inhibiting layer that contains a carbon source in a high-oxygen atmosphere.

As shown in FIG. 2, positive-electrode active material particles 30 that include active material cores 31 and precursors of reaction-inhibiting layers 32, which each contain a carbon source, that are coated thereon are subjected to a heat treatment in a high-oxygen atmosphere. Then, a carbon-containing reaction-inhibiting layer 42 is formed on a surface of the active material core 41 after the heat treatment. Positive-electrode active material particles 40 are composed of the active material core 41 and the reaction-inhibiting layer 42 after the heat treatment. Because carbon is dispersed in the form of simple substance in the reaction-inhibiting layer 42, the active material particle 40 has electron conductivity.

The reason why carbon is present in the form of simple substance in the reaction-inhibiting layer after the heat treatment in a high-oxygen concentration atmosphere is conceivable to be as follows. It is first conceivable that the heat treatment in a high oxygen concentration atmosphere promotes pyrolysis of the solvent and hydroxides that remain after the active material cores are respectively coated with the precursors of reaction-inhibiting layers and dried. It is, as a result, conceivable that the reaction-inhibiting layers are densified and carbon tends to be trapped in the form of simple substance in the reaction-inhibiting layers.

The carbon that is present in the form of simple substance in the reaction-inhibiting layers after a heat treatment in a high oxygen concentration atmosphere is derived from a carbon source that is contained in the precursors of reaction-inhibiting layers.

The carbon source may be singly added to the precursors of reaction-inhibiting layers. Alternatively, a compound which serves as both a lithium source and a carbon source may be added to the precursors of reaction-inhibiting layers. As the compound which serves as both a lithium source and a carbon source, an organic acid lithium salt, such as lithium acetate or lithium lactate, may be selected.

Raman spectroscopy may be performed on the positive-electrode active material particles that each include the reaction-inhibiting layer to analyze whether carbon is present in the form of simple substance in the reaction-inhibiting layers. When carbon is present in the form of simple substance in the reaction-inhibiting layers, peaks are observed at 1340 cm$^{-1}$ and 1590 cm$^{-1}$ and detected as clearly discernible peaks that are not buried in the background.

The amount of carbon that is present in the form of simple substance in the reaction-inhibiting layers depends on the amount of the carbon source. Thus, the electron conductivity may be adjusted based on the amount of the carbon source that is contained in the starting material. When lithium acetate $CH_3CO_2Li$ or lithium lactate $C_3H_5LiO_3$ is used, the ratio of carbon atoms to Li atoms in the starting material may be C:Li=2:1 or 3:1 and C:Li=1:1 to 4:1, respectively. In addition, a conductive aid may be further added to the positive electrode composite material when desired.

The precursors of reaction-inhibiting layers, which each contain a carbon source, may be prepared by a sol-gel method. Because a feature of a sol-gel method is the ability to disperse components uniformly, the carbon is dispersed almost uniformly in the final reaction-inhibiting layers. In the aspect of the present invention, the precursors of the reaction-inhibiting layers, which each contain the carbon source, are vitrified.

A precursor solution for use in coating the active material cores with the reaction-inhibiting layer may be prepared by mixing boric acid, tetraethoxysilane (TEOS) and so on in ethanol, hydrolyzing the mixture, and adding an organic acid lithium salt as a lithium and carbon source to the hydrolyzed mixture.

Here, boric acid and TEOS are hydrolyzed and polymerized to form a B—Si glass network. The hydrolysis reaction may be carried out by adding water to the mixture or by reacting the mixture with moisture in the atmosphere. When lithium ions enter the glass network, lithium conductivity is produced.

The active material cores are coated with the prepared reaction-inhibiting layer precursor solution. The active material cores may be coated with the reaction-inhibiting layer precursor solution by any method by which an active material powder can be coated with a solution. For example, the coating may be carried out in a tumbling fluidized coating machine.

When a tumbling fluidized coating machine is used, the thickness of the reaction-inhibiting layers that are respectively formed on the active material cores may be adjusted by changing the coating conditions, such as coating time.

The active material cores, which have been coated with the precursors of reaction-inhibiting layers, are subjected to a heat treatment in a high oxygen concentration atmosphere to obtain the positive-electrode active material particles that are respectively coated with reaction-inhibiting layers, which each contain carbon. The heat treatment in a high oxygen concentration atmosphere removes residual solvent that is contained in the glass network, increases the density of the reaction-inhibiting layer, and allows carbon to be present in the form of simple substance in the reaction-inhibiting layers.

In order to allow carbon to be present in the form of simple substance in the reaction-inhibiting layers, the oxygen concentration may be 50 vol % or higher, 60 vol % or higher, 70 vol % or higher, 80 vol % or higher, 90 vol % or higher, or 95 vol % or higher in the heat treatment.

The heat treatment may be carried out at a temperature at which the densification of the reaction-inhibiting layer is promoted. When the heat treatment temperature is too high, the active material and the reaction-inhibiting layer tend to react with each other. Thus, the heat treatment temperature is 450° C. or lower, preferably 400° C. or lower. For densification of the reaction-inhibiting layer and removal of residual organic matters, the heat treatment temperature is 250° C. or higher, preferably 300° C. or higher.

A specific example of positive-electrode active material particles and the production method of the same according to the aspect of the present invention is shown below.

Example

First, a precursor solution for $Li_3BO_3$—$Li_4SiO_4$ reaction-inhibiting layers was prepared. Boric acid, TEOS, and lithium acetate were dissolved in an ethanol solvent such that 0.066 mol/L of boric acid, 0.066 mol/L of TEOS and 0.463 mol/L of lithium acetate were contained in ethanol to prepare a precursor solution for a $Li_3BO_3$—$Li_4SiO_4$ reaction-inhibiting layer. That is, the boric acid and TEOS were adjusted to be equimolar. The preparation method is described in detail below.

In a beaker, 7.468 g of $H_3BO_3$ was dissolved in 141.0 g of ethanol. In another beaker, 25.170 g of TEOS was dissolved in 141.0 g of ethanol. The one solution of $H_3BO_3$ and the other solution of TEOS were mixed and stirred. Then, 13.05 g of deionized water was added to the mixed solution, and the mixture was stirred for 22 hours.

In a beaker, 86.251 g of $CH_3COOLi.2H_2O$ was added to 1441.4 g of ethanol and the mixture was stirred for 2 hours to dissolve the $CH_3COOLi.2H_2O$. The solution was mixed with the mixed solution of $H_3BO_3$ and TEOS that was prepared as described above, and the mixture was stirred for 20 hours to prepare a precursor solution for $Li_3BO_3$—$Li_4SiO_4$ reaction-inhibiting layers.

Active material cores were coated with the prepared reaction-inhibiting layer precursor solution in a tumbling fluidized coating machine (MP-01, manufactured by Powrex Corporation).

That is, 1250 g of a $LiCo_{1/3}Ni_{1/3}Mn_{1/3}O_2$ positive-electrode active material powder with an average particle size of 4 μm was placed in the tumbling fluidized coating machine, and dry air at 50° C. was introduced as a fluidizing gas into the tumbling fluidized coating machine at a rate of 0.25 m$^3$/min. The prepared precursor solution was sprayed from a spray nozzle at a rate of 4 g/min while the positive-electrode active material powder was being stirred up and circulated in the tumbling fluidized coating machine by dry air. The tumbling fluidized coating machine was operated for 8 hours to obtain a positive-electrode active material powder that was coated with precursors for $Li_3BO_3$—$Li_4SiO_4$ reaction-inhibiting layers.

The positive-electrode active material powder that was coated with precursors for $Li_3BO_3$—$Li_4SiO_4$ reaction-inhibiting layers was placed in an alumina crucible and subjected to a heat treatment in an electric furnace for 5 hours at an oxygen concentration of 95 vol % and at a temperature of 350° C. As a result, positive-electrode active material particles each include $Li_3BO_3$—$Li_4SiO_4$ reaction-inhibiting layer were obtained. Observation of cross-sections of the obtained positive-electrode active material particles under a transmission electron microscope (TEM, JEM-2100F, manufactured by JEOL, 200 kV) revealed that the active material cores were respectively coated with $LiBO_3$—$LiSiO_4$ reaction-inhibiting layers with an average thickness of 10 nm.

Next, a comparative example of positive-electrode active material particles and the production method of the same according to the aspect of the present invention is shown below.

Comparative Example

A precursor solution for a reaction-inhibiting layers was prepared and active material cores were respectively coated with the precursor solution under the same conditions as those in Example. Then, a heat treatment was carried out in an electric furnace in the atmosphere (oxygen concentration: 21 vol %) at 350° C. for 5 hours to obtain positive-electrode active material particles that each include a reaction-inhibiting layer. The active material cores were respectively coated with reaction-inhibiting layers with an average thickness of 10 nm.

Raman spectroscopic analyses were performed for carbon that was contained in the reaction-inhibiting layers, which the positive-electrode active material particles each include, that were prepared in Example and Comparative Example. The analysis conditions were as follows; excitation wavelength: 514.5 nm, laser power: 20 mW, laser spot diameter: 1 μm, exposure time: 30 seconds, number of times of integration: 8, diffraction lattice: 600 gr/mm, confocal hole diameter: 30 μm, at room temperature and in the atmosphere.

Figure 3:
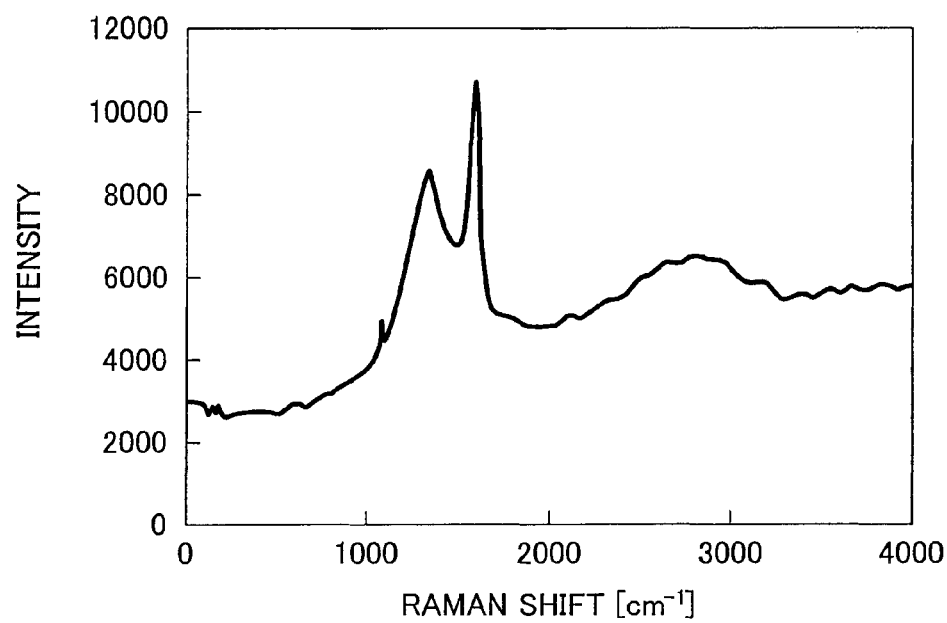
FIG. 3 is a raman spectrum of positive-electrode active material particles that each include a reaction-inhibiting layer according to Example of the present invention.
Figure 4:
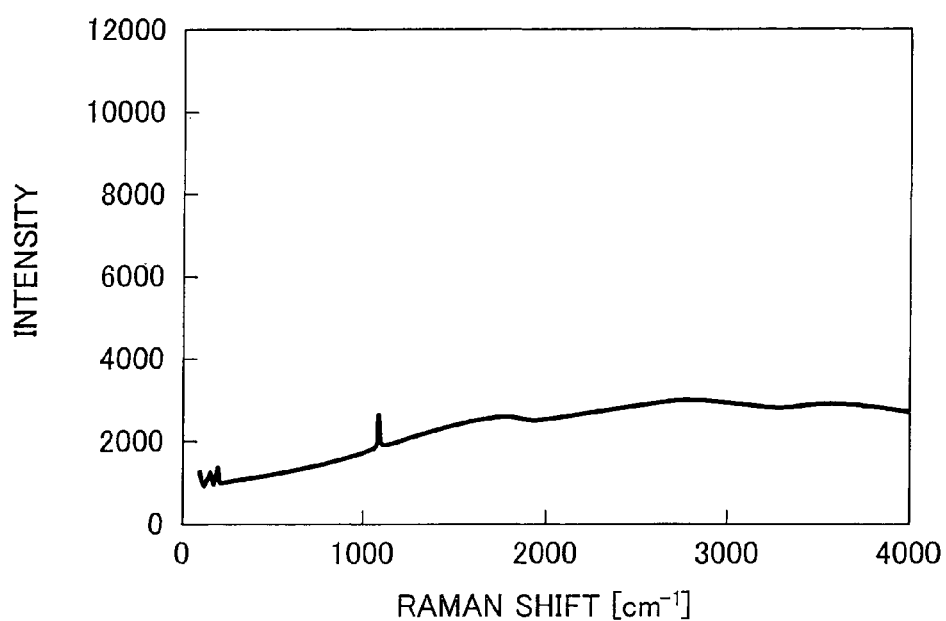
FIG. 4 is a raman spectrum of positive-electrode active material particles that each include a reaction-inhibiting layer according to Comparative Example.

FIG. 3 shows the raman spectrum of the reaction-inhibiting layers of the positive-electrode active material powder that was prepared in Example. FIG. 4 shows the raman spectrum of the reaction-inhibiting layers of the positive-electrode active material powder that was prepared in Comparative Example. As shown in FIG. 3, the raman spectrum of the reaction-inhibiting layers that were formed in Example had peaks at 1340 $cm^{-1}$ and 1590 $cm^{-1}$, which suggest the presence of carbon in the form of simple substance. On the contrary, as shown in FIG. 4, the raman spectrum of the reaction-inhibiting layers that were formed in Comparative Example did not have similar peaks. The analysis results indicate the presence of carbon in the form of simple substance in the reaction-inhibiting layers that was formed in Example.

The above results prove that positive-electrode active material particles that are respectively coated with reaction-inhibiting layers which are respectively formed on the surfaces of active material cores to prevent an increase in interface resistance between the active material and the solid electrolyte and which contains carbon, which has electron conductivity, in the form of simple substance can be obtained by the method of the present invention.

The invention claimed is:

1. A positive-electrode active material particle for an all-solid battery which includes a sulfide-based solid electrolyte, comprising:
   a core of an active material particle having a size of about 0.5 to 10 μm; and
   a reaction-inhibiting layer which contains carbon in a form of simple substance,
      wherein the reaction-inhibiting layer coats an entire surface of the core of the active material particle, the reaction-inhibiting layer having a thickness of 1 to 100 nm,
   wherein
      the simple substance of carbon is dispersed uniformly in the reaction-inhibiting layer, and
      wherein the reaction-inhibiting layer has a Raman spectrum including discernible peaks at 1340 $cm^{-1}$ and 1590 $cm^{-1}$, wherein the Raman spectroscopic analysis conditions include excitation wavelength: 514.5 nm, laser power, 20 mW, laser spot diameter: 1 μm, exposure time: 30 seconds, number of times of integration: 8, diffraction lattice: 600 gr/mm, confocal hole diameter: 30 μm, conducted at room temperature.

2. The positive electrode active material particle according to claim 1,
   wherein the reaction-inhibiting layer is holohyaline.

3. The positive electrode active material particle according to claim 2,
   wherein the reaction-inhibiting layer includes one of a lithium conducting oxide and a composite oxide.

4. A production method for positive-electrode active material particles for an all-solid battery which includes a sulfide-based solid electrolyte, each of the positive-electrode active material particles comprising a core of an active material particle having a size of about 0.5 to 10 μm and a reaction-inhibiting layer which contains carbon in a form of simple substance, wherein the reaction-inhibiting layer coats an entire surface of the core of the active material particle, the reaction-inhibiting layer having a thickness of 1 to 100 nm, wherein the simple substance of carbon is dispersed uniformly in the reaction-inhibiting layer, and wherein the reaction-inhibiting layer has a Raman spectrum including discernible peaks at 1340 $cm^{-1}$ and 1590 $cm^{-1}$, wherein the Raman spectroscopic analysis conditions include excitation wavelength: 514.5 nm, laser power: 20 mW, laser soot diameter: 1 μm, exposure time: 30 seconds, number of times of integration: 8, diffraction lattice: 600 gr/mm, confocal hole diameter: 30 μm, conducted at room temperature, the production method comprising:
   preparing precursors of the reaction-inhibiting layers that each contain a carbon source and that inhibit a reaction between the sulfide-based solid electrolyte and the active material particles;
   coating the core of the active material particles with the precursors of the reaction-inhibiting layers; and
   performing a heat treatment on the cores of the active material particles that have been coated with the precursors of the reaction-inhibiting layers, in an atmosphere with an oxygen concentration of 50 vol % or higher, to form the positive-electrode active material particles.

5. The production method according to claim 4,
   wherein the precursors of the reaction-inhibiting layers are prepared by mixing an organic acid lithium salt and a solution that forms a glass network.

6. The production method according to claim 4,
   wherein the precursors of the reaction-inhibiting layers are prepared by mixing boric acid, tetraethoxysilane and an alcohol to prepare a solution in which a B—Si glass network has been formed by a hydrolysis reaction, and mixing the solution in which a B—Si glass network has been formed with an organic acid lithium salt.

7. The production method according to claim 5,
   wherein the organic acid lithium salt is one of lithium acetate and lithium lactate.

8. The positive electrode active material particle according to claim 1,
   wherein the core of the active material particle includes a lithium transition metal oxide.

9. The production method according to claim 4,
   wherein the active material core includes a lithium transition metal oxide.

10. The positive electrode active material particle according to claim 3,
    wherein the reaction-inhibiting layer comprises a lithium conducting oxide, a ratio of carbon atoms to lithium atoms in a starting composition used to form the reaction-inhibiting layer being C:Li=1:1 to 4:1.

* * * * *